United States Patent
Voigt

[11] 3,713,611
[45] Jan. 30, 1973

[54] RESILIENT MOUNTS FOR SUPPORTING POSTS

[75] Inventor: William L. Voigt, Boxford, Mass.

[73] Assignee: Western Electric Company, Incorporated, New York, N.Y.

[22] Filed: Feb. 19, 1971

[21] Appl. No.: 116,756

[52] U.S. Cl. ................................248/44, 248/160
[51] Int. Cl. ...........................................E04h 12/22
[58] Field of Search.....................248/44, 160, 188.8

[56] References Cited

UNITED STATES PATENTS

| | | | |
|---|---|---|---|
| 3,040,636 | 6/1962 | Gregoire | 248/44 UX |
| 2,009,040 | 7/1935 | Beach | 248/160 X |
| 2,172,682 | 9/1939 | Rauba | 248/44 |

*Primary Examiner*—William H. Schultz
*Attorney*—W. M. Kain and R. P. Miller

[57] ABSTRACT

An impact absorbing block of resilient material is utilized as an intermediary to support a post on a base. The block has a bore extending therethrough with a shoulder formed therein to support (1) the post and (2) a fastener which extends from the bore to draw the block against the base. The bottom surface of the block is dished-out so that the drawing up of the fastener compresses the peripheral edge of the block against the base to provide a dust-free seal.

3 Claims, 3 Drawing Figures

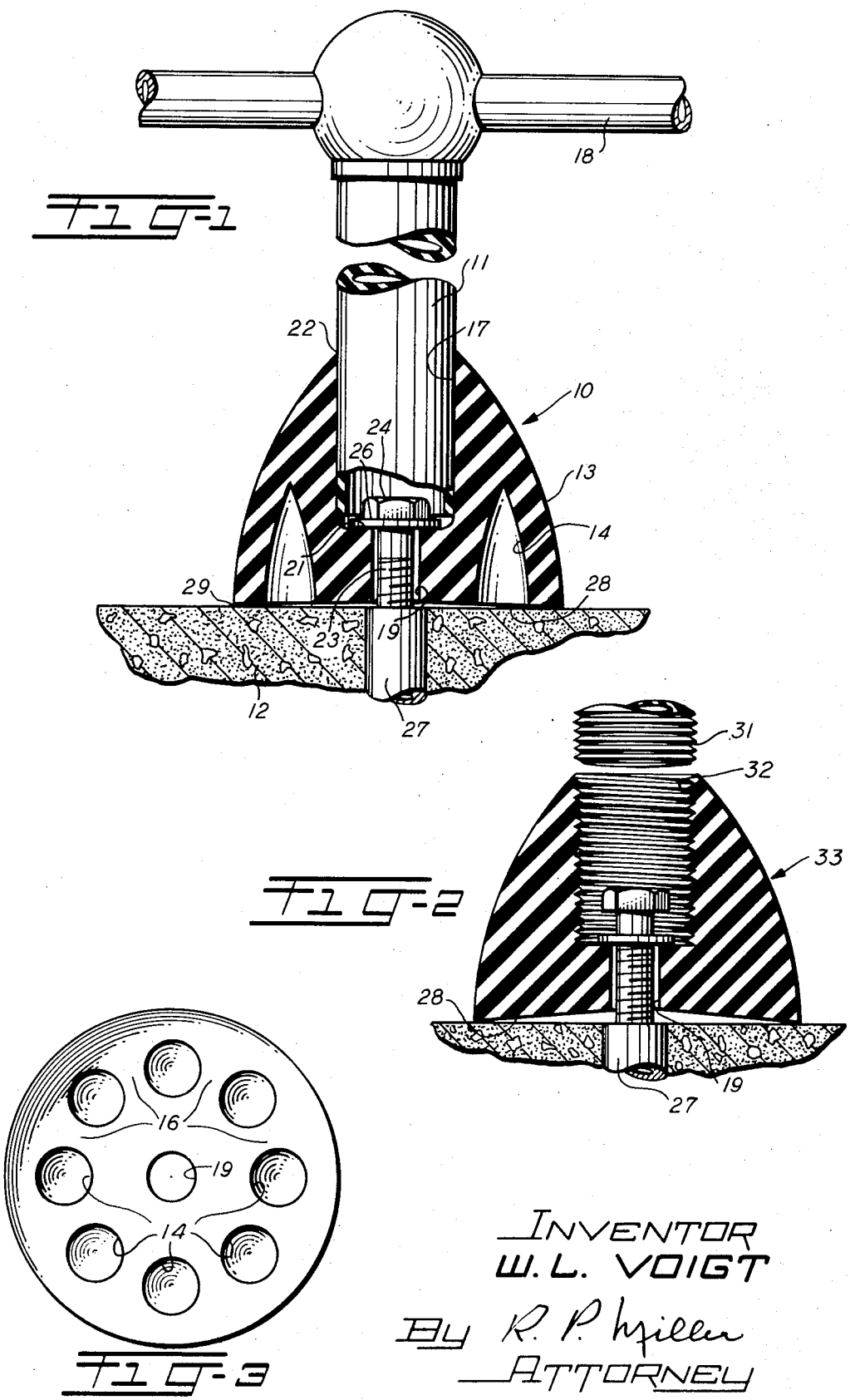

RESILIENT MOUNTS FOR SUPPORTING POSTS

BACKGROUND OF THE INVENTION

1. Field of the Invention

This invention relates to resilient mounts for supporting posts or the like and more particularly to quick detachable mounts for resiliently supporting a post on a base.

2. Prior Art and Technical Consideration

In the construction of many diverse types of structures and installations, the basic building element is a post which is anchored to or seated in a base or floor. These posts find wide use in factory or commercial areas to support guard rails, time clocks, partitions, aisle dividers, signs, parking meters, etc. In the past, these posts have been mounted on floors by means of cast iron flanged hubs. The hub receives the post and the flange is secured by a number of bolts extending through the flange and into anchors seated in the floor. Such installations are subject to much abuse by personnel or by being struck by vehicles such as lift trucks. This abuse results in the working loose of the bolts or anchors, thus requiring frequent repair or replacement. In many instances, these installations, upon being struck by a vehicle, are torn or ripped from the floor requiring replacement of sections of the floor. The projecting bolt head and the uneven juncture between the flange and floor are dust, grease, and dirt collectors which require frequent cleaning.

In order to alleaviate some of these problems, the posts have been seated in the floor. Again, such an installation is subject to damage upon being struck by moving vehicles. In other installations, a rubber sleeve is seated in a hole formed in the floor and the post mounted in the sleeve. These installations are adapted to absorb some impact, but are difficult and expensive to install.

It may be thus appreciated that there is a need for a post mount which is easy to install and maintain while being capable of absorbing repetitive abuse and impact.

SUMMARY OF THE INVENTION

The present invention contemplates a post and resilient mount assembly that may be quickly installed or replaced and which may be easily maintained and yet be capable of absorbing personnel abuse and impact forces upon being hit by a moving vehicle. More particularly, the invention may take the form of a block of resilient material having a bore extending therethrough for receiving the post. The bore may be provided with a shoulder for supporting a fastener which extends from the bore and into a base. The underside of the block may be provided with a concave surface so that the drawing up of the block against the base by the fastener results in compressing the peripheral edge of the undersurface to provide a neat and firmly seated, dust-free seal between the mount and the base. The compression of the block also increases the stability of the block in supporting the post. The post may be force-fitted or screwed into the block to provide a dust-free juncture between the post and the block. In addition, the block may be fabricated to have a curvilinear configuration to prevent the accumulation of dust and grime and enhance the appearance of the mount.

DESCRIPTION OF THE DRAWING

FIG. 1 is a side elevational view, partially in section, of a resilient mount and post assembly embodying the principles of the invention;

FIG. 2 is a side elevational view, partially in section, of a modified post and mount assembly wherein the post is screwed into the mount; and FIG. 3 is a view of the underside of the mount showing an array of cavities to reduce the mass of the mount.

DETAILED DESCRIPTION

Referring to FIG. 1 there is shown a resilient mount 10 for supporting a post 11 on a base or floor 12. The mount 10 is formed with a curvilinear outer surface 13 which may, in some applications, be hemispherical in shape. The mount itself is formed of a body of resilient material such as natural or synthetic rubber which has sufficient stiffness to support the post 11 in an upright position. A plurality of cavities 14 (see also FIG. 3) extend from the underside of the mount to reduce the overall mass. Ribs 16 extend between the cavities 14 and are of sufficient width to maintain the structural strength of the mount.

The mount is formed with a bore 17 to receive the post 11 which may be in form of a pipe or a solid rod or other configuration and which may be constructed of cast or formed iron, wood or plastic. The post 11 can be used to support a partition, a sign, a parking meter, a time clock or a rail 18 as illustrated. The bore 17 is in communication with a second bore 19 of smaller diameter so that a shoulder 21 is formed at the juncture of the bores 17 and 19. These bores may be formed by a machining operation or formed during a molding of the mount 10. The diameter of the bore 17 is selected to be slightly less than the diameter of the post 11 to provide a force-fit between the post and the mount. There is a tight joint formed at the juncture 22 of the post in the mount to preclude the entry of dirt and grease.

The mount 10 is secured to the base 12 by a suitable fastener such as a bolt 23. Bolt 23 has a head 24 abutting a washer 26 resting on the shoulder 21. The base 12 is drilled to receive a lead anchor or threaded insert 27.

It will be noted from FIG. 1, that the underside of the mount has a concave or dished-out surface 28. Upon drawing up of the bolt 23 in the anchor 27, the outer periphery of the surface 28 is compressed to provide a tight seal at a juncture 29 between the surface 13 of the mount and the surface of the base 12. The compression of the peripheral edge of the mount increases the rigidity and stability of the mount to maintain the post 11 in an upright position. Further, the tight juncture 29 precludes the entry of dirt and grease to the underside of the mount.

In the installation and use of the mount, a hole is first bored in the base 12 and a lead anchor is seated therein. The mount 10 is placed with aperture 19 aligned with the anchor. The bolt 23 and washer 21 are inserted within the mount. A socket wrench is used to turn the bolt and draw it within the anchor 27. The washer 26 acts against the mount to compress the peripheral edge of the underside 28 against the base surface. Post 11 is then forced within the bore 17 to again provide a dust-free seal at the juncture 22.

With the dust-free seals and the curvilinear surface, the mount does not accumulate dirt and grease and may be readily cleaned by merely wiping the outer surface 13. Upon a repetitive or impact force being imparted to the post 11, the force is absorbed by the give of the resilient mount 10 without subjecting the bolt 23 and the anchor 27 to high impact forces.

It may be appreciated that the particular construction described may be modified such as the substitution of other types of quick detachable fasteners for the bolt 23 and anchor 27 arrangement and that the post 11 may be secured in the mount 10 in other fashions. For example, referring to FIG. 2, both a post 31 and a bore 32 in a resilient mount 33 are threaded so that the post may be screwed into the mount. In another modification, (not shown) it is contemplated that the post be provided with a few wide pitch threads and that the post be screwed into the resilient wall of the bore. Again, in this instance, the bore has a diameter that is slightly smaller than that of the post.

It may be appreciated that other changes and modifications may be made in the mount assembly and its component parts without departing from the spirit and scope of the invention.

I claim:

1. A mounting for resiliently supporting a member on a base;

a substantially solid block of resilient material having a slightly concave surface and a curvilinear surface extending from the periphery of the concave surface, said block having a first bore extending from the apex of the concave surface and a second bore larger than the first bore for receiving the member in close-fit relationship so that the entry of foreign matter between the member and the second bore is precluded, said second bore extending from the apex of the curvilinear surface to form a shoulder at a juncture of the bores for supporting the member positioned in the second bore; and a fastener resting on the shoulder and extending through the first bore for drawing the concave surface of the substantially solid block into engagement with the base to compress the peripheral edge of the block at the juncture of said concave and curvilinear surfaces thereby sealing said peripheral edge to the base to preclude the entry of foreign matter therebetween and providing a stable, resilient mounting to maintain in an upright position the member positioned in the second bore.

2. A mounting as set forth in claim 1 wherein the second bore is threaded to cooperatively engage threads formed in the member thereby providing a close-fit relationship so that entry of foreign matter between the member and the second bore is precluded.

3. A mounting as set forth in claim 1 wherein the substantially solid block of resilient material is formed of rubber.

* * * * *